United States Patent [19]

Wright et al.

[11] 4,075,818
[45] Feb. 28, 1978

[54] IMPULSE SEALING APPARATUS

[75] Inventors: Donald R. Wright, Midland, Mich.; Henry D. Swartz, Chestnut Hill, Mass.

[73] Assignee: The Dow Chemical Company, Midland, Mich.

[21] Appl. No.: 693,070

[22] Filed: Jun. 4, 1976

[51] Int. Cl.$^2$ .................. B65B 51/30; B65B 51/14; B65B 9/12

[52] U.S. Cl. ............................ 53/180 R; 53/373; 62/5; 62/331; 156/498; 156/583; 219/243

[58] Field of Search ............... 53/29, 39, 177, 180 R, 53/180 M, 182 R, 182 M, 329, 373; 156/498, 583; 62/5, 6, 331; 219/243, 143; 93/19, 20

[56] References Cited

U.S. PATENT DOCUMENTS

| 2,621,704 | 12/1952 | Langer | 219/243 X |
|---|---|---|---|
| 2,714,416 | 8/1955 | Fener | 156/583 |
| 2,796,914 | 6/1957 | Park | 156/583 X |
| 2,961,031 | 11/1960 | Fener | 219/243 X |
| 3,026,681 | 3/1962 | Green | 62/5 |
| 3,173,273 | 3/1965 | Fulton | 62/5 |
| 3,340,129 | 9/1967 | Grevich | 156/498 |
| 3,389,033 | 6/1968 | Ullman, Jr. | 219/243 X |
| 3,496,049 | 2/1970 | Anderson | 156/583 X |
| 3,692,613 | 9/1972 | Pederson | 156/583 X |
| 3,942,330 | 3/1976 | Schroder | 62/5 |

FOREIGN PATENT DOCUMENTS 2,234,334 1/1973 Germany .............................. 53/373

Primary Examiner—Othell M. Simpson
Assistant Examiner—Horace M. Culver
Attorney, Agent, or Firm—B. M. Halldorson

[57] ABSTRACT

Impulse sealing apparatus having a forced cooling cycle following the impulse heating cycle, and comprising in combination, a vortex tube which converts a source of compressed gas at ambient temperature into a cold gas stream, a heat exchanger cooled by the cold gas stream generated by the vortex tube, a second source of pressurized ambient temperature gas communicating with the heat exchanger and cooled thereby, and means for removing the second source gas stream from the heat exchanger and communicating with the impulse sealer for supplying chilled gas thereto.

1 Claim, 6 Drawing Figures

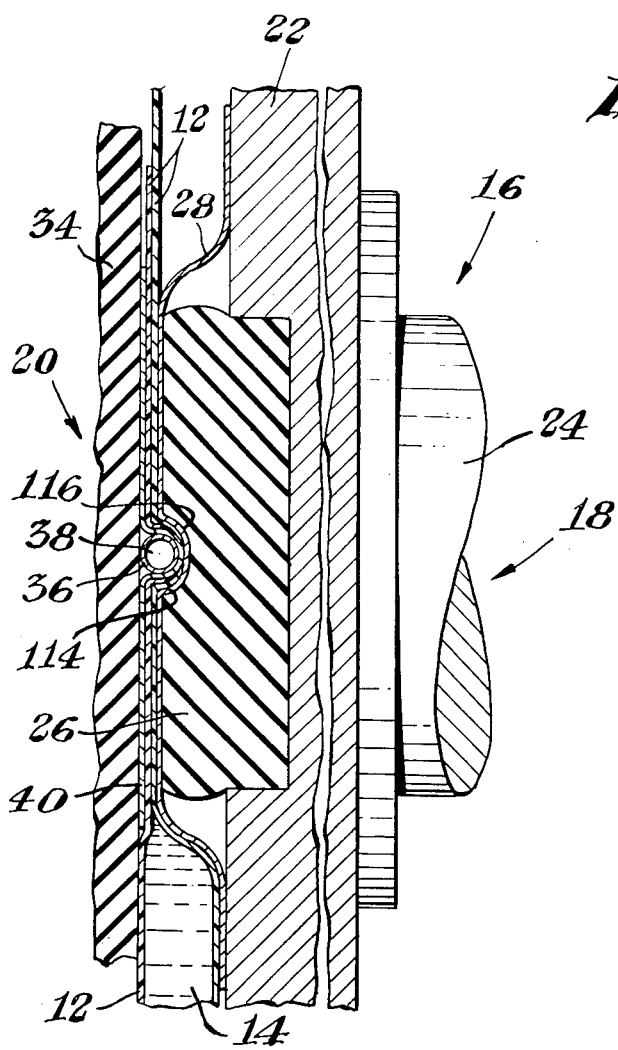
Fig.2
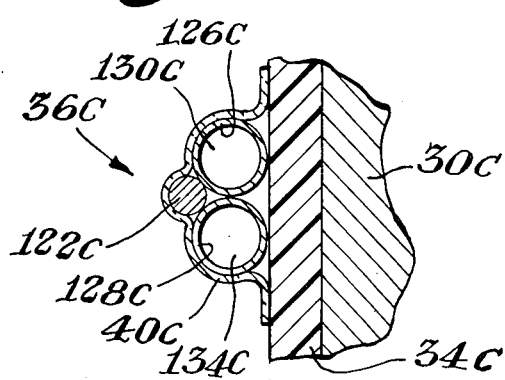
Fig.5
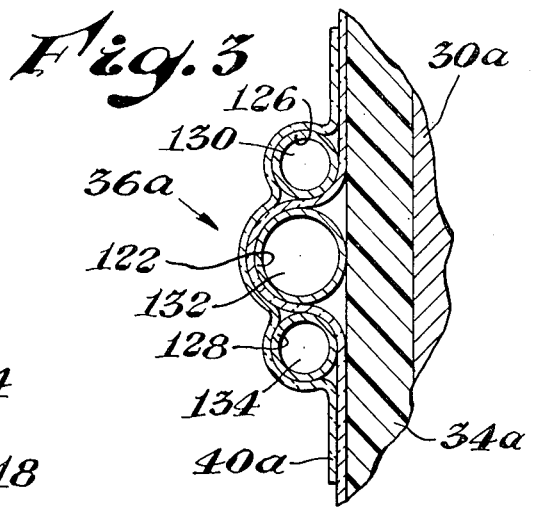
Fig.3
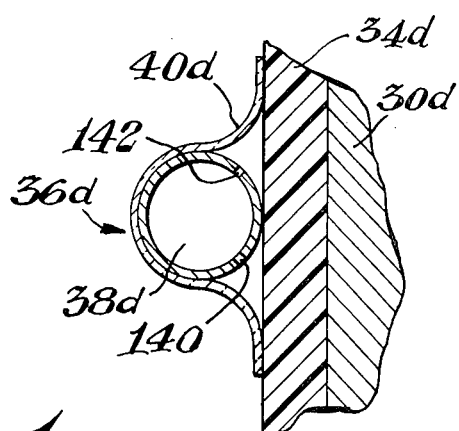
Fig.4
Fig.6

IMPULSE SEALING APPARATUS

FIELD OF THE INVENTION

The invention relates generally to the art of sealing heat sealable materials such as heat sealable thermoplastic film and sheet materials (i.e. web materials). The invention, more particularly, relates to improved methods and apparatus for heat sealing thermoplastic web materials in automatic form-fill-seal packaging machines.

BACKGROUND OF THE INVENTION

The steps of form, fill and sealing of thermoplastic packages can be carried on simultaneously and economically by various known automatic packaging machines. Economical pillow packages may be formed, for example, using automatic machines which convert flat web materials into a continuous tube, fill the tube, and seal the tube transversely at spaced intervals to complete a relatively simple and desirable filled package.

Automatic machines of this type have been highly successful in the past. Despite good acceptance in some areas, however, the technology is still plagued by a proneness to a high rate of seal imperfections in many applications.

The transverse seal is particularly difficult, and is commonly the leaking seal when defective products are produced on these machines. Because of the tendency for a commercially unacceptable rate of leakers, machines in this field have particularly not been able to satisfactorily service applications such as liquid pouch packaging where strong hermetic seals are especially required. Water based products can be handled somewhat better than oily or syrupy products which are extremely difficult to package. However, even for water based products, cycle times are oftentimes slow in respect to the upper production capacities of the machines since at fast cycles the quality of the seals can deteriorate rapidly. An optimum machine, of course, would form exceedingly tough seals at fast cycles to produce pouches that adequately protect the packaged contents.

Accordingly, it is an object of this invention to provide improved apparatus for heat sealing thermoplastics and other heat sealable materials.

It is a further object of this invention to provide such apparatus wherein the design of the same is both practical and efficient, and permits faster sealing cycles than is typically achieved on contemporary commercial equipment.

It is still a further object of this invention to provide such apparatus wherein improved seal toughness is achieved to provide a more optimum package.

It is still a further object of this invention to provide a method and apparatus for heat sealing thermoplastic web materials that is highly suited for use on automatic form-fill-seal packaging machines and particularly machines used in the field pouch packaging.

These and other objects of the invention are achieved by the improved apparatus of the invention comprising in combination with an impulse sealer having means therein to utilize a stream of pressurized refrigerated gas to provide positive cooling to the work product, (i) a vortex tube adapted to convert compressed gas at ambient temperature into a cold gas stream,
 (ii) a heat exchanger cooled by the cold gas stream generated by the vortex tube,
 (iii) a second source of compressed ambient temperature gas to the heat exchanger, and
 (iv) a means to remove the source gas (iii) from the heat exchanger after cooling thereof and communicating with said impulse sealer for providing cooling gas to said positive cooling means.

Yet additional objects and advantages of the present invention, and its numerous and cognate benefits, are even more apparent and manifest in and by the ensuing description and specification taken in conjunction with the accompanying drawing, in which wheresoever possible, like characters of reference designate corresponding material:

FIG. 2 is an enlarged cross-sectional view taken along reference line 2—2 of FIG. 1 showing the detail of the heat sealing and cutting element of the impulse sealer hereof, the sealing jaws in this view being shown in the closed position; and FIGS. 3-6 are enlarged cross-sectional views generally like FIG. 2, and showing modified forms of the invention.

DETAILED DESCRIPTION OF THE PREFERRED EMBODIMENTS

Figure 1:
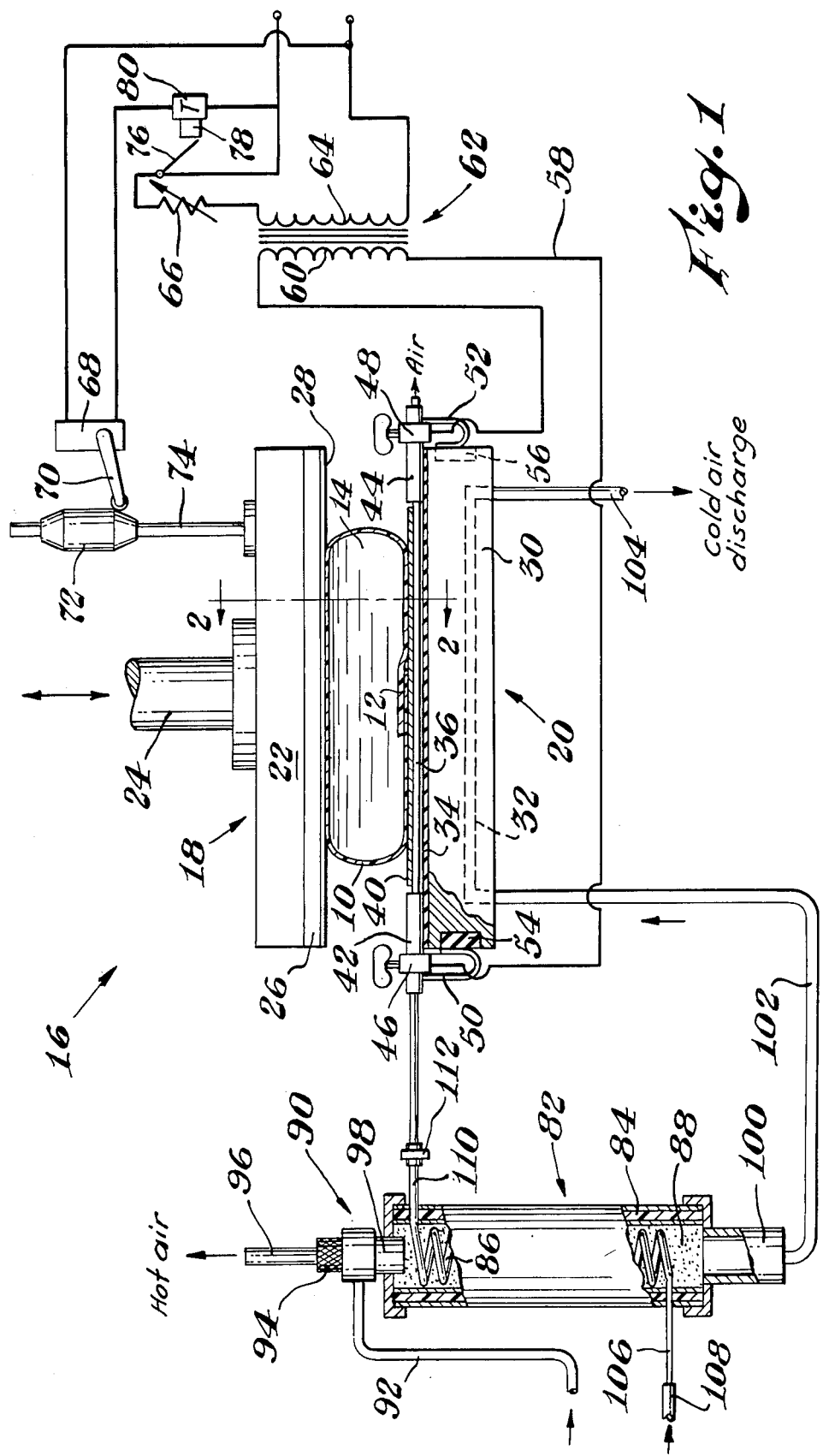
FIG. 1 is a generally schematic and diagrammatic view, with certain parts in cross-section, showing impulse sealing apparatus constructed according to the teachings and principles of this invention wherein the apparatus is viewed from the top in this Figure in reference to its incorporation in a vertical form, fill and seal automatic packaging machine.

Referring first to FIGS. 1 and 2, the work product 10 is a heat sealable tube converted from a continuous web of flat film or sheet and sealed longitudinally in the overlap area as shown at 12. The tube is filled with controlled amounts of product 14. Apparatus which prepares the tube to this state is shown and typically represented by the apparatus of U.S. Pat. Nos. 2,432,373; 2,837,883; and 3,538,676, the teachings of which are herein incorporated by reference.

Sealing apparatus 16 for forming the transverse seals comprises opposed sealing jaws comprising a movable pressure jaw assembly 18, and a stationary sealing jaw assembly 20. The movable jaw assembly comprises a carrier plate 22 which is moved and returned from engagement and disengagement with the sealing jaw assembly by a reciprocally driven shaft 24. The carrier plate 22 evenly supports a resilient back-up element or compressible back-up pad 26 that serves as the back-up surface in forming the heat seal and which is, in turn, covered by a thin tape or layer of a release material 28.

The stationary jaw assembly comprises a carrier plate 30 which is hollow for admitting cooling gases through an internal cooling channel 32. The carrier plate 30 at its working face includes a layer of a rigid electrical insulation or an insulating layer 34. The insulating layer backs up and supports an elongated heat sealing and cutting element 36 having a hollow core herein also referred to as a cooling vein or channel 38 (see FIG. 2). The sealing and cutting element is covered by a sheath or a layer 40 of a suitable release material. Electrical buss bars 42, 44 are secured to each end of the sealing and cutting element such as by soldering. The buss bars in turn are releasably held in clamps 46, 48. The clamps are mounted to carrier plate 30 through leaf springs 50, 52 which in turn are secured to insulation pads 54, 56, respectively, inlaid at each end of the carrier plate.

The heat sealing and cutting element is energized through a circuit 58 originating from a secondary winding 60 of a step-down transformer 62. The current and voltage to the primary winding 64 of the transformer is regulated by a rheostat 66. The circuit to the primary winding is intermittently energized by a normally open switch 68 through a mechanical trip arm 70. The trip arm is tripped by a cam 72 which is threadably adjustable on a shaft 74 secured to carrier plate 22 of the movable jaw assembly. The duration of the impulse or current through the primary winding is independently controlled through a second normally open switch 76, a solenoid 78 which actuates switch 76, and a timer 80 which actuates the solenoid.

Referring now specifically to FIG. 1, a heat exchanger 82 comprises a hollow insulated jacket 84. The jacket houses a hollow cooling coil 86 and is packed with a heat exchange medium preferably a mesh or screen of copper material 88. A vortex tube 90 is joined to one end of jacket 84 and is operated by compressed gas or air supplied from a line source 92. The vortex tube converts the compressed gas or air from source 92 into a cold stream and a hot stream in the known manner; the proportions and temperature of which are variable by means of an adjusting knob 94. The hot stream is vented to the atmosphere through the hot end or hot outlet 96 of the vortex tube. The cold stream is delivered through the cold end or outlet 98 of the vortex tube to the heat exchanger to cool coil 86, after which it is exhausted through a vortex muffler 100. The exhaust is piped to carrier plate 30 of the sealing jaw assembly by a connecting piping line 102 communicating with cooling channel 32. Eventually the spent gas, after cooling the carrier plate, is expelled to the atmosphere through an exhaust port or pipe 104.

The cooling coil 86 of the heat exchanger includes an inlet end 106 which is supplied compressed gas from a second line source 108, and an outlet end 110. The gas after travelling the length of the coil and being cooled is admitted into the cooling vein of the heating and sealing element to provide preferably continuous cooling thereto. A flexible tubular insert 112 electrically insulates the outlet end of the coil from the electrically energized heating and cutting element.

OPERATION

In operation, work product 10 is delivered to sealing apparatus 16 for formation of the transverse seals. The apparatus 16 cuts through the tube forming the top seal on the last filled tube segment, and simultaneously the botton seal on the next-to-be-filled segment of the tube. Each sealing cycle is followed by a downward movement of the tube to the successive sealing position, and a filling step.

The sealing cycle is commenced by the programming of the form, fill and seal apparatus in the known manner, whereby the movable back-up jaw assembly is advanced by shaft 24 into engaging relationship with the stationary jaw assembly. Advancement of the movable jaw assembly trips switch arm 70 against cam 72 thereby energizing the primary winding of transformer 60 through closing switches 68 and 76, (the latter being closed by timer 80 through solenoid 78). The secondary winding thereupon provides an impulse of current across the heat sealing and cutting element to heat the element to a temperature sufficient to cut transversely across the tube. Simultaneously, heat is applied along each side of the cut line to seal the cut edges. Adjustment of the rheostat and the setting of the timer determine and control the duration of the impulse and the temperature to which the element is heated.

Reference is now made specifically to FIG. 2. In the clamped or engaged position, the opposed layers of the tube are pressed flatly together between the movable and stationary jaw assemblies. Generally simultaneously, the sealing and cutting element, heated by an impulse of current to the softening or melt temperature of the material, is pressed through both layers, to sever or cut the tube transversely with the assistance of the compressible back-up pad. The compressible back-up pad squeezes or conforms the cut ends or edges 114, 116 of the tube against the curved sides of the cutting and sealing element to provide pressure to seal the heat softened material along the extent of each cut edge. After sufficient heat or BTU's are transferred to the film, to effect the sealing condition, the timer times out thereby opening switch 76 and breaking and de-energizing the circuit. The cooling vein which preferably is continually cooled by the cold gas stream, is thus permitted to thereafter dominate to rapidly diffuse residual heat from the sealed edges 114, 116.

Seals formed according to the invention show characteristic ripples. For example, a typical seal structure obtained according to the invention frequently evidences a corrugated or rippled effect when viewed along its length. Such a seal structure is not as attractive, of course, as a smooth non-wrinkled seal that is normally attained by contemporary impulse sealing techniques. However, a simple test to determine attaining a strong seal prepared by this invention is to examine for the rippled characteristic of the seal indicating that the seal was able to relax or shrink as it cooled. Where the seal is very smooth on the other hand, it is oftentimes significantly weaker than the relaxed seal described above.

The selection of the heat sealing and cutting element may be determined on the basis of minimizing energy requirements. For example, in comparable embodiments, a heat sealing and cutting element ⅛ inch O.D. stainless steel tubing, and 0.0225 inch wall thickness, required approximately 140 amps at 10 volts; whereas a smaller element of 1/16 inch O.D. stainless steel tubing and 0.005 inch wall thickness, required approximately 40 amps at 10 volts. Since both elements made relatively good seals, the choice of the smaller element would be preferred in this particular environment. Another preferred size tube element 36 has an O.D. of 0.067 inch and a wall thickness of 0.0085 inch and is also of stainless steel.

Other known materials, of course, may be selected to construct element 36, such as for illustration, Nichrome, Inconel, and Monel metal alloys. However, since forced cooling is practiced by the invention, the criteria for selecting the material differs over conventional practice in that higher energy loads must be carried by the element without change in its resistivity or its predictable heating response. For example, excessive energy loads can shock the material or element 36 if it is of undercapacity to such load, such that its resistivity is altered. Accordingly the size or cross-section of the element and its material construction must be designed keeping in mind the higher energy capacity requirements of this invention in order to properly practice these teachings.

Forty durometer silicone rubber is generally preferred for the compressible back-up pad 26. Teflon coated glass tape or cloth is referred for the release layer material. A 5 mil Telfon coated fiberglass cloth shows good preformance in accomplishing the objectives of this invention as the release layer for the surface of the compressible back-up pad. A 3 mil cloth of like material is preferred as the sheathing for the heat sealing and cutting element in order to provide faster heat transfer to the work product.

In some applications, a heat gradient over the length of the sealing and cutting element may build up over relatively long periods of operation. This is caused by the cooling air slowly warming as it passes along the length of the heat sealing and cutting element. The warmer air at the exhaust end may eventually cause this end of the sealing and cutting element to build up to a temperature that degrades the release layer. Extra cooling of the pressurized gas stream to the sealing and cutting element substantially eliminates the heat gradient problem. For example, if such a problem is manifest, it is desirable to use more than one vortex tube (or a larger size vortex tube) to cool the heat exchanger, thereby reducing the temperature of the air admitted to the sealing and cutting element. A less preferred solution, since it contemplates additions to the apparatus, is to alternate the flow direction of the cooling gas with each sealing cycle, or at longer intervals. For example, the cooled gas may be admitted at one end of the tube or element 36 for a predetermined period, and with the addition of appropriate valving, the gas flow can then be switched, and admitted at the opposite end of the tube or element. Accordingly since the directionality of flow is changed based on a predetermined cycle, the heat gradient may be controlled within practically any limits desired.

The preferred temperature of the cooling gas, as it leaves, or is exhausted from element 36 may be measured with the heat sealing and cutting element 36 turned off to obtain a stabilized reading, and thereafter with element 36 intermittenly heated to get a cyclic or varying reading. For example, with the circuit to element 36 de-energized, the temperature of the exhaust cooling gas preferably stabilizes at a temperature of about 40° F or below, and most optimally stabilizes at a reading of about 20° F or below. During operation, with element 36 being intermittently heated, the temperature of the exhaust gas cycles over a temperature range wherein at the high temperature reading of the cycle, the exhaust gas will typically be about 50° F to about 10° F warmer than the temperature of the exhaust gas as measured at its lowest reading in the cycle. Most beneficially, the pressure of the cooling gas stream, (as measured in the vicinity of clamp 46,) is at an input pressure of about 60 psig or greater, and most preferably is in a range of between about 60 psig to about 200 psig.

In respect now to further refinements of the invention the shape of the sealing and cutting element is preferably cylindrical as shown. It is desirable in some applications to shape the crown or high point of the sealing and cutting element by glass blasting or by other suitable means in order to provide a shallow cutting ridge. Also it is understood that the heat sealing and cutting element may take other forms. For example, heat sealing and cutting elements of triangular, oval and other shapes are known to the art, and by providing such known shapes with a hollow core or cooling vein as taught herein, and by cooling the core of the element by a stream of presurized refrigerated gas, improved impulse sealing may be obtained according to these teachings embodying these known modifications.

In respect now to the buss bars shown at 42, 44 in FIG. 1, the material used is preferably brass, and of sufficient mass to serve the function of a heat sink. In this regard, the extreme ends of the sealing and cuting element 118, 120, shown in FIG. 1, make infrequent or noncontact with the tube or work product. Since the tube repeatedly withdraws heat from the sealing and cutting element, the central part of the element which makes repeated contact with the tube, tends to remain relatively cooler than the extreme end areas 118, 120. This can eventually cause problems in the deterioration of the sheathing and the release layers unless stabilized. The use of the heat sinks thus tends to withdraw heat build-up from the extreme ends of the sealing and cutting element to keep these areas relatively cooler.

Referring now to FIGS. 3-6, various modified forms of the heat sealing and cutting element are shown. In FIG. 3, the heat sealing and cutting element 36a comprises an impulse heated central component or tube 122. Disposed intimately along each side of component 122, and electrically insulated therefrom by a layer of insulating material 124, are a pair of thin hollow components or tubes 126, 128. A second layer of material 40a, which serves as a release layer, forms a covering for the above described components. The heat sealing and cutting element 36a defines multiple cooling veins 130, 132, 134 which are in the form of hollow cores defined in components 122, 126 and 128, respectively. The use of the several cooling veins thus permits gas under pressure to flow through the heat sealing and cutting 36a from its opposite ends respectively, in order to counterbalance the effect of any build-up of a detrimental heat gradient over the length of the element. For example, the gas cooling the outer veins 130, 134 may be admitted from one end of the heat sealing and cutting element 36a, whereas cooling gas supplied to the central vein 132 may be admitted from the opposite end or far end thereof so as to flow counter to the streams in the cooling veins 130, 134.

Thus, the heat sealing and cutting element 36a can be designed by the foregoing principles to make available a generally more uniform cutting and sealing temperature across the entire length of element 36a in order to prevent hot spots or build-up of hot spots as might eventually deteriorate the synthetic material of the release and insulation layers, or which would tend to excessively heat the film in localized areas because of excessive build-up of a substantial heat gradient.

FIG. 4 shows a generally similar heat sealing and cutting element 36b with the exception that the current carrying component or central component 122b thereof is a solid impulse heated component absent the cooling vein described above. The outer components 126b, 128b, which are electrically insulated from the central element and therefore not subjected to direct impulse heating, define cooling veins 130b, 134b in which counter flowing streams may be used to provide the forced cooling step disclosed in these teachings.

FIG. 5 illustrates further a three component sealing and cutting element 36c which is generally similar to that described with respect to FIG. 4 wherein the same includes a central impulse heated component 122c, and immediately adjacent thereto a pair of side-by-side thin hollow tubes or components 126c, 128c, each defining a cooling vein 130c, 134c. In this instance, however, the outer components 126c, 128c are not electrically insulated from the central component 122c and thus will be heated by the impulse of current. However, the elimination of the insulation layer provides faster cooling in the cycle immediately following the application of the impulse of current in order to meet the objectives of the invention. The design here can provide excellent seals. However, as may be noted, since three rather than one component are being impulse heated, generally higher energy usage may be expected.

FIG. 6 represents yet another modified form of the invention wherein a single component heat sealing and cutting element 36d is utilized having a hollow core or cooling vein 38d of a structure much similar to that described with regard to FIG. 1 above. However, the heat sealing and cutting element 36d, which is impulse heated in the described manner, is cooled differently in that the central cooling vein 38d is vented through the perforation means 140, 142 in order to expell the cooling gas along the region adjacent each side of the element. Thus, gas expelled or vented essentially along the entire length of the modified cutting and sealing element 36d is able through the perforation means 142, 144 to provide cooling locally along the adjacent sides of the sealing and cutting element. Most preferably element 36d is close ended, with gas piped in at right angles to each end thereof so that essentially the entire exhaust of the cooling gas is through the perforation means 142, 144.

The use of the sealing element 36d appears to form a smooth seal structure typically rather than a rippled seal structure as described generally above. Whether this is a generalized characteristic of this type of element or whether it is specific to that certain design used in the lab is not at this time understood or known. However, experiments with the forced cooling impulse sealing apparatus using that specific modification shown in this FIG. 6 has demonstrated good preformance and the attainance of a smooth seal which is nevertheless very strong in structure.

The term "vortex tube" as used herein means a device for converting compressed gas of ambient termperature into cold and hot gas streams, optimally without the use of moving parts. Illustrative examples of same are shown and described in U.S. Pat. Nos. 3,173,273 and 3,208,220, the teachings of which are herein incorporated by reference.

While the foregoing invention has been described particularly in regard to vertical form, fill and seal automatic packaging machines, it is obvious that the invention has broader applications. For example, the invention may be used generally in applications for form, fill and sealing of packages, as opposed to the species vertical form, fill and seal machine describe above. Also it is understood that this teaching is to be treated as illustrative of the invention rather than comprehensive and that further and various modifications of the apparatus and methods hereof are obvious in view of these teachings. For example, the cooling gas may be applied cyclically after each impulse heating step, the later being the preferred form of the invention. It should also be apparent that the cooling vein(s) may be positioned differently such as on or near the surface of the pressure supplying or back-up jaw, rather than the preferred form where the same is integrally included as a part of the sealing and cutting element. Accordingly, it is intended to limit the scope of this invention only to the extent indicated in the appended claims.

What is claimed is:

1. Apparatus for heat sealing of thermoplastic web materials in form-fill and seal fluid pouch packaging machines comprising, in combination: opposed sealing jaws faced with a release material, at least one sealing jaw containing a first internal cooling channel and a second internal cooling channel, one of said cooling channels being located closely adjacent the face of said jaw, a single vortex tube in open communication with a heat exchanger and one of said cooling channels, said heat exchanger having a cooling coil and an exhaust means, one of said cooling channels being supplied cooled gas from the coil of said heat exchanger, the other of said channels being supplied cooled gas from said vortex tube through the exhaust means of said heat exchanger, whereupon after the thermoplastic web is sealed the same is cooled rapidly by the plural fluid flows contained in jaw.

* * * * *